United States Patent

Dann

[15] 3,681,702

[45] Aug. 1, 1972

[54] HIGH SPEED PIM DEMODULATOR

[72] Inventor: Bert H. Dann, Mountain View, Calif.

[73] Assignee: International Video Corporation

[22] Filed: Aug. 31, 1970

[21] Appl. No.: 68,160

[52] U.S. Cl. ..................329/102, 307/233, 325/322, 328/110, 329/104, 329/122

[51] Int. Cl. ............................................H03d 1/18

[58] Field of Search......329/102, 103, 104, 106, 107, 329/50, 122; 307/233, 232, 247; 328/109, 110, 66; 325/322

[56] References Cited

UNITED STATES PATENTS

| | | | |
|---|---|---|---|
| 3,386,041 | 5/1968 | Bell | 307/233 X |
| 3,387,219 | 6/1968 | Dann | 307/233 X |

*Primary Examiner*—Alfred L. Brody

*Attorney*—Limbach, Limbach & Sutton

[57] ABSTRACT

A high speed demodulator for PIM modulated signals. A pair of time-controllable ramp generators providing ramps of constant slope that return to a fixed reference level are alternately steered by a PIM input signal to generate a series of ramps having periods commensurate with the semi-periods of the PIM modulated signal. A demodulated video signal is provided by low pass filtering the ramp waveforms.

Automatic dropout blanking is provided in alternative embodiments whereby a regenerative feature places the circuit in a self-oscillating mode to generate a video blanking when the input signal levels drops below a predetermined threshold.

19 Claims, 5 Drawing Figures

INVENTOR.
BERT H. DANN
BY Limbach, Limbach & Sutton
ATTORNEYS

INVENTOR.
BERT H. DANN
BY
Limbach, Limbach & Sutton
ATTORNEYS

INVENTOR.
BERT H. DANN
BY
Limbach, Limbach & Sutton
ATTORNEYS

INVENTOR
BERT H. DANN

BY Limbach, Limbach & Sutton
ATTORNEYS

HIGH SPEED PIM DEMODULATOR

BACKGROUND OF THE INVENTION

This invention relates generally to demodulators and more specifically to apparatus for demodulating pulse interval modulated (PIM) signals in video tape recording (VTR) systems. Provision is made for automatic dropout blanking.

PIM is a type of time modulation differing from FM in that the semiperiod of the modulated wave is a linear function of the modulating signal amplitude at the end of the semiperiod; in FM, the frequency is a linear function of instantaneous amplitude. The basic PIM system is described in U.S. Pat. No. 3,319,013 to Wayne K. Hodder. PIM modulators are disclosed in U.S. Pat. Nos. 3,371,288 and 3,425,000 to B.H. Dann.

The nature of the PIM modulated wave creates a requirement for a high-speed demodulator circuit; the time constant of the circuit must be shorter than the shortest semi-period of the modulated wave. Speed is even a greater problem in so-called "high band" VTR systems wherein higher modulated signal frequencies are encountered.

In the reproduction of slant-track video tapes, the amplified radio-frequency (RF) output of the head system falls to zero, or at least to an unusually low signal-to-noise ratio, at the crossover point from one tape edge to another. Since the periodic signal loss is customarily arranged to fall within the vertical blanking interval and since it has the gross characteristics of a tape dropout, it will be referred to as "vertical dropout" herein.

In both PIM and frequency modulation (FM), the vertical dropout causes the output of most practical limiter/demodulator systems to assume levels outside the normal video signal range. Levels above peak white may cause bright flashes during vertical retrace; levels below sync tip may cause false vertical synchronization, and either may cause overloading.

In prior art PIM and FM demodulators, the effects of vertical dropout are ordinarily eliminated by deriving a signal indicative of the vertical dropout and applying it to the video output amplifier so as to cause the final output level to be at or near blanking level during dropout. No attempt is made to correct the demodulator action that causes the extreme level excursions.

In prior art FM system, a multivibrator (multi) drives the FM demodulator and a threshold circuit preceding the multi is arranged to allow the multi to free-run at a frequency corresponding to blanking level when the RF input falls below a predetermined amplitude.

SUMMARY OF THE INVENTION

A pair of generators having short recharge time constants alternately generate ramps that return to the same initial level. Failure to return to the same level would result in a distorted output signal. The ramps are steered by the input PIM modulated wave to produce a series of ramps of varying length, corresponding to the length of each PIM semiperiod. The average of the composite wave derived from the two ramp generators is the demodulated signal. Embodiments having automatic dropout blanking are disclosed wherein a regenerative sub-circuit begins to oscillate at the video blanking frequency to control the ramp generators when the PIM input signal drops below a predetermined threshold.

DESCRIPTION OF THE PREFERRED EMBODIMENTS

Figure 1:
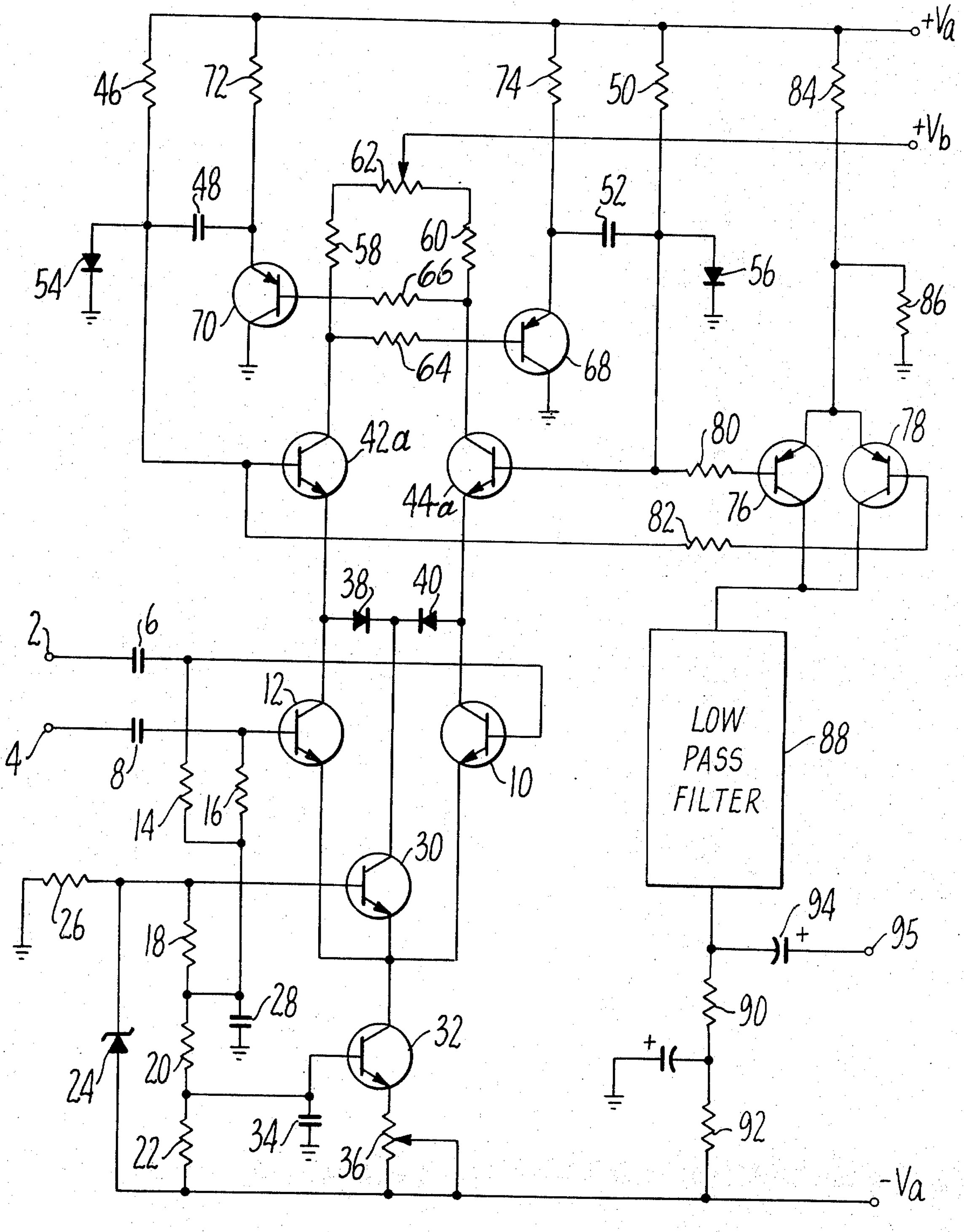
FIG. 1 is a schematic circuit diagram of an embodiment of the demodulator of the present invention.

Referring now to FIG. 1, wherein a schematic circuit diagram of an embodiment of the PIM demodulator according to this invention is shown, wherein a push-pull input from a preceding limiter stage is applied via input terminals 2 and 4 through coupling capacitors 6 and 8 to the bases of a pair of NPN transistors 10 and 12, respectively. A biasing network for transistors 10 and 12 includes resistors 14 and 16 connected to each base and to a junction on a voltage divider comprising resistors 18, 20, 22, and Zener diode 24 connected to a negative voltage source $-V_a$. A load resistor 26 connects the cathode of diode 24 to ground. Capacitor 28 at the junction of resistors 14, 16, 18, and 20 RF bypasses the bases of resistors 10 and 12 to ground.

The base of transistor 30 is connected to the junction of resistors 18 and 26 and the anode of diode 24. The emitters of transistors 10, 12, and 30 are connected to the collector of a transistor 32. The base of transistor 32 is connected to a second tap on the voltage divider, the junction of resistors 20 and 22 and is RF bypassed by a capacitor 34. A potentiometer 36 is connected between the emitter of transistor 32 and the negative voltage supply $-V_a$; the slider of the potentiometer is also connected to the negative supply $-V_a$. Thus transistor 32 functions as a variable current source to adjust the blanking level as will become more apparent hereinafter.

Series diodes 38 and 40, having their cathodes connected together are connected between the collectors of transistors 10 and 12. The junction of the diodes is connected to the collector of an NPN transistor 30. The collectors of transistors 10 and 12 are also connected to the emitters of a pair of NPN transistors 42a and 44a, respectively, operating in a multivibrator arrangement. The bases of transistors 42a and 44a are connected to the RC timing elements consisting of resistor 46 - capacitor 48 and resistor 50 - capacitor 52, respectively. Diodes 54 and 56 are connected between the bases of transistors 42 and 44, respectively, and ground. Load resistors 58, 60 and potentiometer 62 with its rider connected to a positive voltage source $+V_b$ are connected between the collectors of transistors 42 and 44a. Potentiometer 62 acts as a balance control for the multivibrator. Resistors 64 and 66 also connect the transistor 42a and 44a collectors to the bases of a pair of PNP transistors 68 and 70, respectively. Bias resistors 72 and 74 are connected between the emitters of transistors 70 and 68, respectively, and a second positive voltage source $+V_a$. The sources $+V_a$ and $-V_a$ are of equal magnitude and opposite polarity, +12 and −12 volts, for example. Source $+V_b$ is of a lower voltage than $+V_a$ and is +6 volts, for example. Capacitors 48 and 52 are also connected to the transistor 70–68 emitters, respectively.

A pair of PNP output transistors 76–78 have their bases connected via coupling resistors 80–82 to the bases of multivibrator transistors 44*a* and 42*a*, respectively. The emitters of output transistors are connected together to a biasing resistor 84 that is connected to the second positive voltage source $+V_a$. An emitter degeneration resistor 86 is connected between the transistor 76–78 emitters and ground. The transistor 76–78 collectors are connected together to an output filter 88 which may be a low pass filter such as an LC filter of conventional design. Resistors 90 and 92 connected between the filter and the negative supply act as a current source. The demodulated output appears at terminal 95 connected by a coupling capacitor 94.

In operation, input $V_{in}$ at terminals 2 and 4 is either a substantially rectangular PIM signal wave such as shown in FIG. 3a having essentially two levels: above a positive threshold, $+V_T$, and below a negative threshold, $-V_T$, with a short switching time period between levels; or the inputs receive a signal within the threshold levels $\pm V_T$ as shown in FIG. 2*a*. This condition occurs during vertical dropout or some other loss of input signal. Resistor 18 determines the threshold $V_T$.

Figure 2:
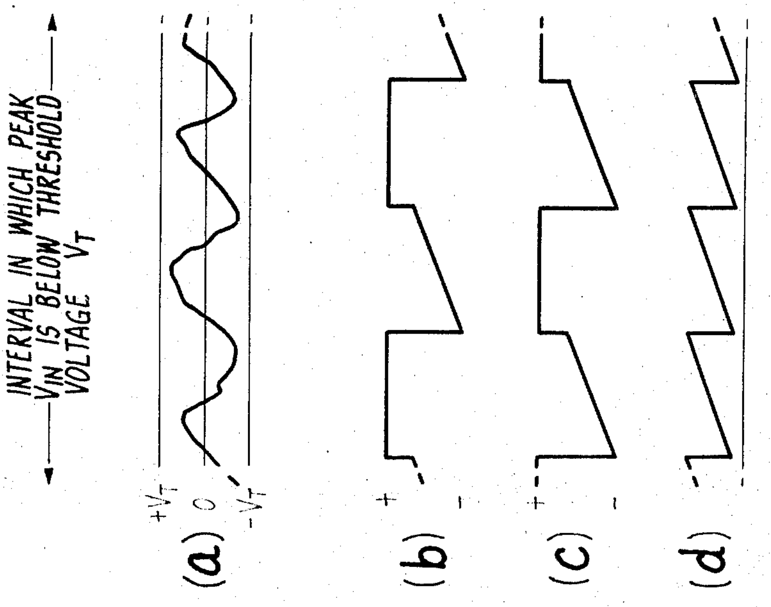

The case of a signal below threshold, including no signal, will now be discussed and it will be shown that the multivibrator 42*a*–44*a* will be free-running to provide a blanking level output determined by potentiometer 36. In the absence of a signal below threshold, transistors 10 and 12 are cut off by the fixed bias, however, transistor 30 is on and acts as current source. Transistors 10, 12 and 30 are arranged so that the collector current at transistor 32 is always constant independent of which transistor 10, 12 or 30 is on. The current $I_E$ is a constant level determined by blanking level potentiometer 36. Since 10 and 12 are cut off, the current flows through diodes 38 and 40. Transistors 42a and 44a alternately conduct at a free-running frequency determined by pot 36 in the following manner. Assume transistor 42a is cut off, transistor 44a is conducting, and at the start of the semiperiod (half cycle) in question capacitor 48 was charged to a predetermined voltage. Capacitor 48 discharges linearly due to base current source resistor 46. As capacitor 48 discharges the base voltage of transistor 42a rises linearly from a negative to a more positive voltage because the base voltage of 42*a* is due not only to the capacitor voltage but also to the collector voltage of 44a which appears at the emitter of emitter follower 70 and also at one side of capacitor 48. At a particular base voltage, transistor 42a will begin to conduct causing a switchover the collector voltage of transistor 48 drops, the base of transistor 68 goes negative and so does the emitter of 68. The voltage change of the 68 emitter is reflected across capacitor 52 to the base of transistor 44a thus turning it off. The collector of transistor 44a goes to the positive supply voltage $+V_a$ briefly cutting off transistor 70. One end of capacitor 48 is clamped to the forward drop diode 54 and capacitor 48 is charged rapidly through resistor 72. Thus a completely repeatable reference charge condition is established for capacitor 48 and in a like manner for capacitor 52. The important factor is for each capacitor to recharge before the shortest possible half-cycle. When transistor 44*a* turned on its base immediately dropped to a negative value as shown in FIG. 2 (c). Conversely, when transistor 42*a* turns on its base immediately drops to the same negative value as shown in FIG. 2(b). Transistors 76 and 78 are closely matched and the one having the most negative base will conduct while the other is cut off. Thus the output current I out from the collectors of 76–78 is a sawtooth of constant period and slope as shown in FIG. 2(*d*). Low pass filter 88 provides a DC output signal at the blanking level in response to the sawtooth.

Figure 3:
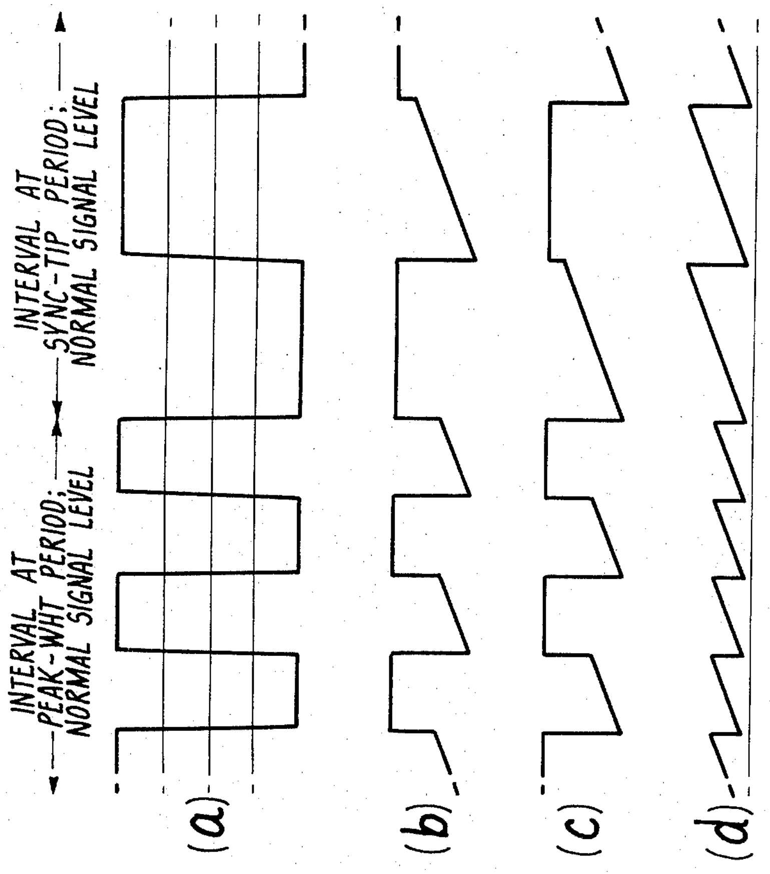
FIGS. 2*a* – 2*d* and FIGS. 3*a* – 3*d* are waveforms useful in understanding the operation of the circuit of FIG. 1.

In the case of a normal PIM signal input above the threshold level, transistors 10 and 12 will alternately conduct (10 or 12 conducts depending on which base is most positive). Since the zero crossings are quite short and in view of the turn on delay of diodes 38 and 40 and transistor 30, these elements may be considered to be out of the circuit. "Steering" of the multivibrator by the input signal must occur for demodulation to take place. This occurs as follows. Transistors 10 and 12 alternately conduct (on the positive and negative portions of the rectangular PIM wave) acting as switches to control transistors 44*a* and 42*a* which begin to act as amplifiers. In a real sense, the multivibrators cease functioning as a self-oscillating circuit because they are dependent on transistors 10 and 12 for emitter current. Thus it is the conduction of 10 and 12 that determines if 44*a* or 42*a* is conducting. The charging and discharging of capacitors 48 and 52 proceeds in the same manner as described above, however, the discharge periods, but not the discharge rate or initial voltage, are dictated by the PIM signal input as shown in FIGS. 3*a*, *b*, and *c*. The signal input to filter 80 is thus as shown in FIG. 3(*d*) and the circuit output is a demodulated video signal.

Figure 4:
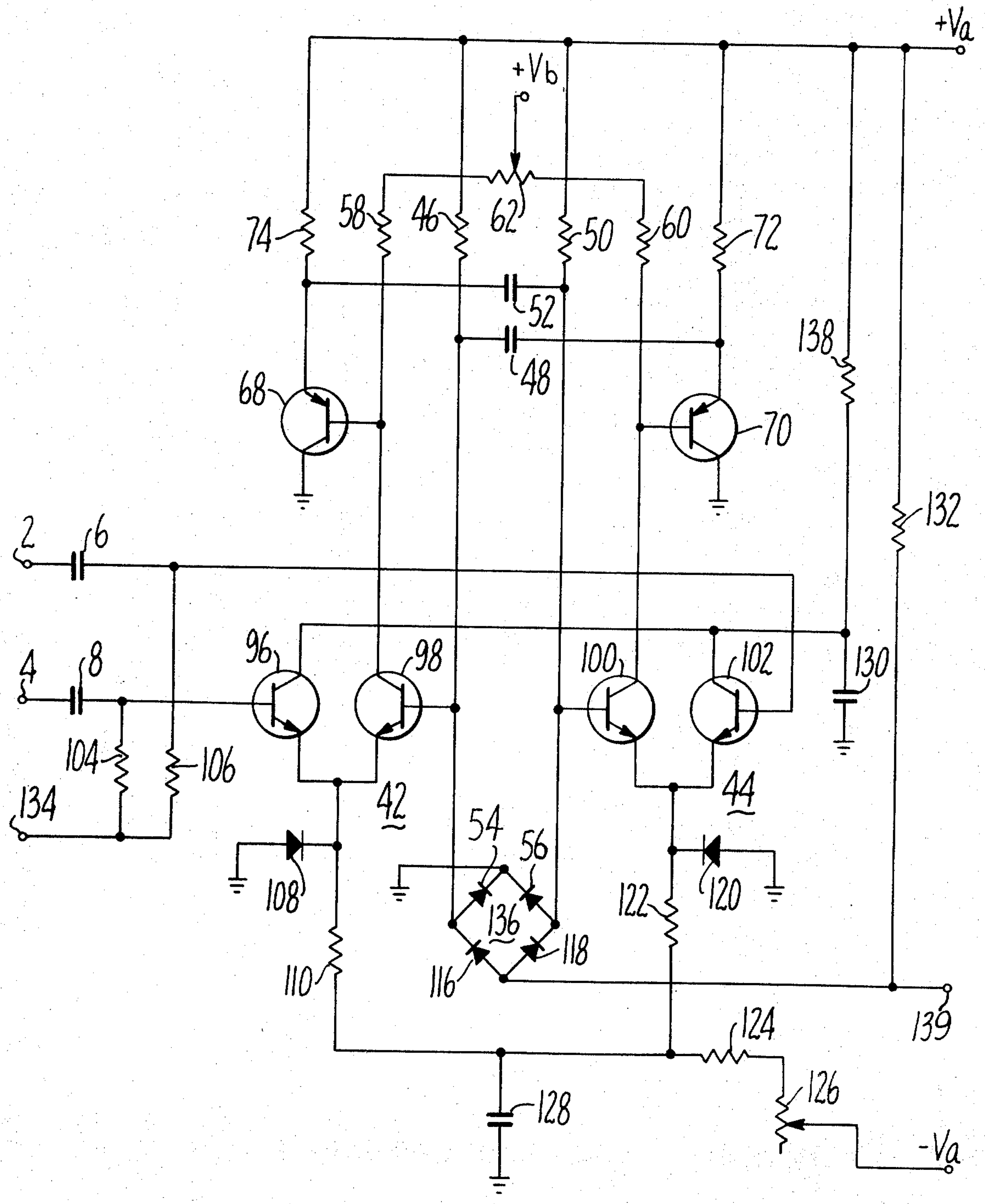
FIG. 4 is a schematic circuit diagram of a further embodiment of the demodulator of the instant invention.

Referring now to FIG. 4 wherein an alternative embodiment of a demodulator circuit according to the instant invention is shown, similar components are represented by identical numbers as in FIG. 2.

Input terminals 2 and 4 receive the push-pull input which is applied via input capacitors 6 and 8 to the bases of NPN transistors 102 and 96 that are each a half of differential pairs 44 and 42, respectively. A dropout pulse input or fixed bias, as described hereinafter, is applied via terminal 134 and resistors 104 and 106 to the bases of 96 and 102, respectively. The emitters of differential pair 42, i.e. transistors NPN 96 and 98 and of differential pair 44, i.e. transistors NPN 100 and 102, are connected together first to the cathodes of diodes 108 and 120 that are connected to ground, respectively, that are connected to an RF bypass capacitor 128 and to a negative potential source $-V_a$ via series resistor 124 and potentiometer 126. The bases of transistors 98 and 100 are connected first to opposite sides of diode ring 136. The ring is comprised of diodes 54, 56, 116, 118 with the cathodes of 54 and 56 connected to ground, the anode of 56 and the cathode of 118 connected to the base of 100, the anodes of 116 and 118 connected to an output terminal 138, and the cathode of 116 and the anode of 112 connected to the base of 98. The bases of 98 and 100 are further connected to capacitor 48 and 52, respectively and to a first positive supply voltage $+V_a$ via resistors 46 and 50, respectively. The other ends of capacitors 48 and 52 are connected to the emitters of transistors 70 and 68, respectively. The transistors 70 and 68 have their collectors grounded and their bases are connected to the collectors of transistors 100 and 98, respectively, and to opposite ends of potentiometer 62 through load resistors 60 and 68, respectively. The rider of potentiometer 62 is connected to a second positive $+V_b$ voltage supply. The emitters of 70 and 68 are also connected to the first positive voltage source $+V_a$ through resistors 72 and 74. The collectors of transistors 96 and 102 are also connected to the first positive voltage source $+V_a$ via resistor 138. An RF bypass capacitor 130 bypasses the collectors to ground. Voltage sources $-V_a$ and $+V_a$ are nominally of the same amplitude and opposite polarity, −12 and +12 volts, for example. Source $+V_b$ is of less amplitude, say +8.2 volts.

In operation, the free-running condition will occur when the input signal is below the threshold bias level determined by the forward drop of the conducting diode of the pair 116–118 in diode ring 136. Or, the level may be pulled below threshold by a negative pulse at input 134. Transistors 98 and 68 function as 42 and 68 of FIG. 1; transistors 100 and 70 function as 44 and 70 of FIG. 1; diodes 54 and 56 function as in FIG. 1. Diodes 108 and 120 function alternately as low impedance paths to ground to assure complete and rapid cutoff of the transistor (98 or 100) which is going nonconductive. The most negative bias ramp waveform is selected by diodes 116–118. Thus the output at 139 is as shown in FIG. 2d. Diode ring 136 replaces PNP transistors 76 and 78 of FIG. 1. (In FIG. 1, transistors 76 and 78 may be diodes and provide the same function).

In the driven mode, transistors 96 and 102 alternately cut off their associated transistors 98 and 100. Thus as a voltage above threshold is applied at input 4, the base voltage of 96 exceeds that of 98 causing 98 to be cut off. At the same time the input at the base of 102 will have gone negative causing transistor 100 to turn on.

The circuit of FIG. 4 may be operated in a self-blanking mode or alternately may be gated into the free-running mode by a pulse at input 134. Such a pulse may be derived from a subsystem (not shown) which measures the RF envelope amplitude of the input signal to sense dropouts. The subsystem forms no part of this invention.

In order to apply the output of FIG. 4 at terminal 138 to a low pass filter (as 88 in FIG. 1), a linear amplifier or equivalent high impedance input device must be used in order that the composite ramp waveform not be distorted.

Figure 5:
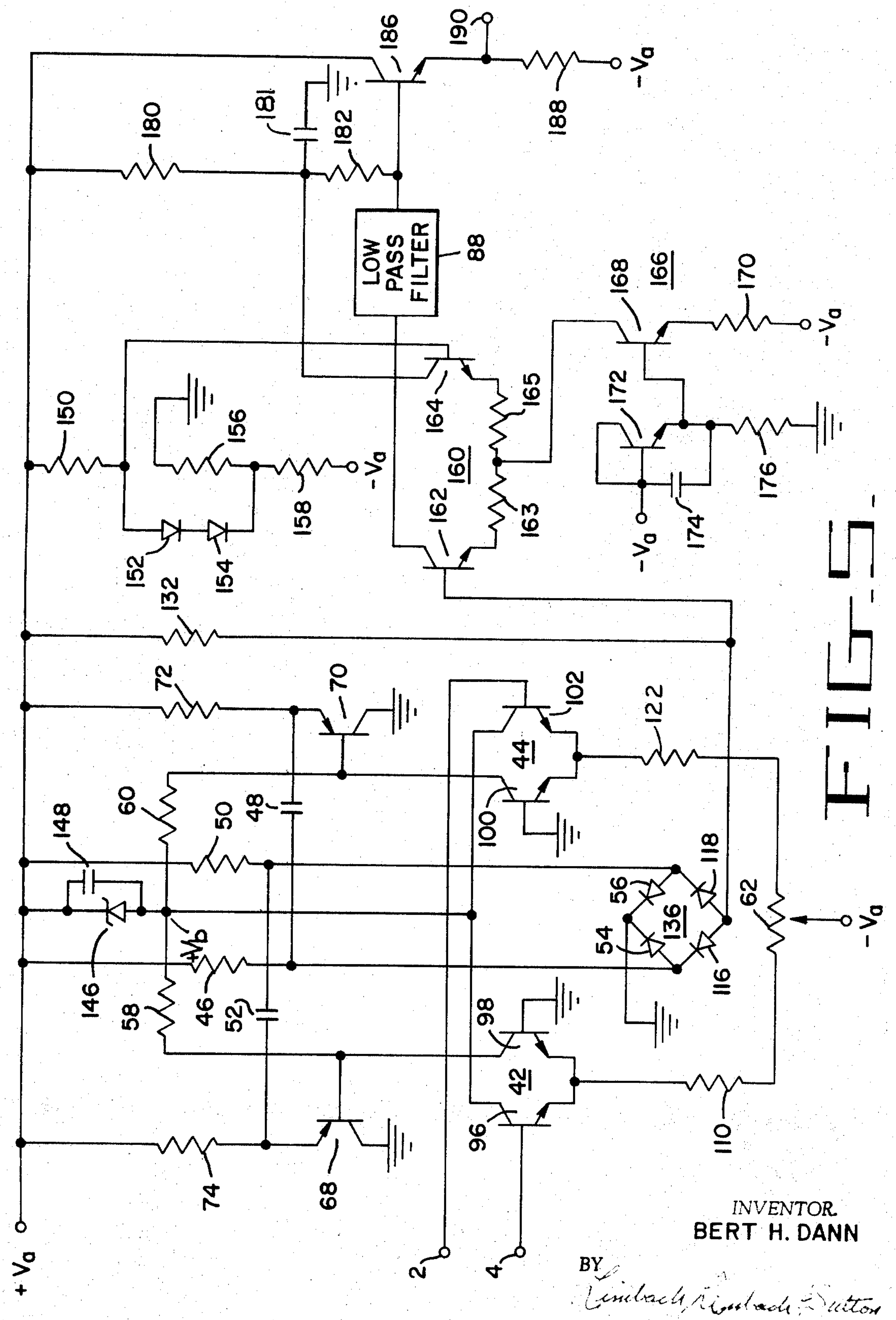
FIG. 5 is a schematic circuit diagram of a further embodiment of the demodulator of the present invention.

In FIG. 5 alternative embodiment of the self-blanking modulator of FIG. 4 is shown. The same reference numerals are retained to identify like parts. The circuit is essentially the same as that of FIG. 4 with the following major exceptions: the positive feedback paths are broken to eliminate the regenerative "self-blanking" feature, balancing is provided in the emitter instead of the collector circuits, and a high impedance linear amplifier is shown driving the low pass filter. The linear amplifier is also applicable to the embodiment of FIG. 4.

Input terminals 2 and 4 receive the push-pull input which is applied to the bases of NPN transistors 102 and 96 that are each a half of differential pairs 44 and 42, respectively. The emitters of differential pair 42, i.e. NPN transistors 96 and 98 are connected together and to a resistor 110. The emitters of differential pair 44, i.e. NPN transistors 100 and 102, are connected together and to a resistor 122. The ends of a tapped resistor 62 are connected to the unconnected ends of resistors 110 and 122 and the tap on resistor 62 is connected to a negative potential source $-V_a$. Differential pairs 42–44 may be balanced by adjusting the resistor 62 tap. The bases of transistors 98 and 100 are connected to ground. A diode ring 136 is provided; comprised of diodes 54, 56, 116, 118 with the cathodes of 54 and 56 connected to ground, the anode of 56 and the cathode of 118 connected to $+V_a$ via resistor 50, the anodes of 116 and 118 connected to an input of linear amplifier 160 and to $+V_a$ through resistor 132, and the cathode of 116 and the anode of 54 connected to $+V_a$ via resistor 46. A capacitor 52 is connected between resistors 50 and diodes 56–118 and a capacitor 48 is connected between resistor 46 and diodes 54–116. The other ends of capacitors 48 and 52 are connected to the emitters of transistors 70 and 68, respectively. The transistors 70 and 68 have their collectors grounded and their bases are connected to the collectors of transistors 100 and 98, respectively, and to $+V_b$ through resistors 58 and 60 respectively. The voltage $+V_b$ is derived from $+V_a$ through a parallel Zener diode 146 and capacitor 148. The emitters of transistors 96 and 102 are also connected to $+V_b$. The emitters of 70 and 68 are connected to $+V_a$ through resistors 72 and 74, respectively. Voltage sources $-V_a$ and $+V_a$ are nominally of the same amplitude and opposite polarity, −12 and +12 volts, for example. $+V_b$ is of less amplitude, say +8.2 volts depending on the Zener diode 146 characteristics.

A high impedance wide band linear amplifier 160 comprising a differential NPN transistor pair 162–164 receives a signal input from diode ring 136 at the base of transistor 162. A bias input to the base of transistor 164 is provided from a back biased series pair of temperature compensating diodes 152 and 154 and through a resistor 150 connected to $+V_a$. The cathode of diode 152 is connected to resistor 150 and the base of 164; the diode 152 anode is connected to the cathode of diode 154 that in turn has its anode connected to the junction of series resistor 156 and 158 that are connected between ground and $-V_a$, respectively.

A constant current source 166 is connected through emitter resistor 163 and 165 to the emitters of transistors 162 and 164, respectively. Source 166 includes NPN transistors 168 and 172; the collector of 168 is connected to the junction of resistors 163 and 165, the emitter is connected to $-V_a$ through resistor 170. The base of 168 is connected to the emitter of 172. Transistor 172 has its base and collector connected together to $-V_a$ and through capacitor 174 to the emitter. A resistor 176 is connected between the emitter of 172 and ground. Transistor 172 functions as a zener diode.

The collector of transistor 162 is connected to a low pass filter 88 that has the same characteristics as the filter 88 in FIG. 1. The collector of transistor 164 is connected to $+V_a$ through a resistor 180 and to the output of low pass filter 88 through resistor 182. An NPN transistor 186 acting as an emitter follower receives the output of low pass filter 88 and provides a demodulated video output at its emitter and terminal 190 connected thereto. The emitter is connected to $-V_a$ through resistor 188 and the collector is connected to $+V_a$. Capacitor 181 and resistor 180 form a decoupling network.

Depending on the video polarity desired, the connections to the collectors of transistors 162 and 164 may be interchanged.

In operation, there is no free-running condition at the blanking level when the input drops below a predetermined threshold, hence, clamping by means of a separately derived clamping pulse will ordinarily be provided in a subsequent stage by circuitry not forming any part of this invention. The circuit operates essentially in the same manner as the embodiments of FIGS. 1 and 4 do when they are in the driven mode and the waveforms of FIG. 3 are therefore also applicable to the FIG. 5 embodiments. Thus, an input waveform such as shown in FIG. 3(*a*) driving input transistors 96 and 102 causes associated differential pair 98 and 100 to be alternately cut off, being steered by the input waveform to cause ramps to appear alternately at the sides of capacitors 48 and 52 connected to ring 136 as shown in FIGS. 3(*b*) and 3(*c*). Diode ring 136 selects the most negative waveform to provide a series of ramps such as shown in FIG. 3(*d*) to the input of wideband amplifier 160. The sawtooth-like signal is low pass filtered by filter 88 and a low impedance video signal is provided at the output of emitter follower 186.

Those of ordinary skill in the art will recognize that many modifications of the embodiments disclosed are possible without departing from the spirit of the invention. Therefore, the invention is to be limited only by the scope of the appended claims.

I claim:

1. Apparatus for providing in a first operating mode a blanking signal output in response to an input signal having an amplitude below a predetermined threshold and for providing in a second operating mode a demodulated output in response to a PIM input signal having an amplitude above a predetermined threshold comprising:
- first capacitor means,
- second capacitor means,
- means for alternately charging said first and second capacitor means to substantially the same predetermined voltage,
- means for alternately discharging said first and second capacitor means at a substantially constant discharge rate,
- means receiving said input signal for controlling said discharging means to generate a series of ramp waveforms alternately at said first and second capacitor means, said first and second capacitor means alternately charging and discharging, said ramp waveforms having substantially equal time periods in said first operating mode, and for controlling said discharging means to generate a series of ramp waveforms having time periods proportional in length to the semi-period lengths of the PIM input signal in said second operating mode,
- means responsive to said input signals for placing said controlling means in said first operating mode when said input signal has an amplitude below a predetermined threshold level and for placing said controlling means in said second operating mode when said PIM modulated input signal has an amplitude above a predetermined level,
- means connected to said first and second capacitor means for providing a composite sawtooth waveform composed of alternatingly generated ramps, and
- means for averaging said composite sawtooth waveform to provide a demodulated output signal.

2. Apparatus according to claim 1 wherein said charging means comprising:
- a voltage source,
- first and second diode means, first and second resistor means
- means for alternately connecting in series a first branch comprising said voltage source, said first resistor means, said first capacitor means, and said first diode means, one end of said first diode means being connected to ground, and a second branch comprising said voltage source, said second resistor means, said second capacitor means, and said second diode means, one end of said second diode means being connected to ground whereby said first and second capacitor means are alternately charged in a series RC circuit between said voltage source and ground.

3. Apparatus according to claim 2 wherein said means for alternately connecting in series said first and second branches comprises first and second transistors having their emitters connected between said first resistor means and said first capacitor means and between said second resistor means and said second capacitor means, respectively, and having their collectors connected to ground.

4. Apparatus according to claim 3 wherein said means for alternately discharging said first and second capacitor means comprises current source means.

5. Apparatus according to claim 4 wherein said means for controlling said discharging means comprises:
- third and fourth transistors having their bases connected respectively to said first and second capacitor means and having their emitters connected to said constant current source means,
- fifth and sixth transistors receiving said input signal at the bases thereof and having their collectors connected to the emitters of said third and fourth transistors,
- first and second diodes having their cathodes connected to the collectors of said fifth and sixth transistors and having their anodes connected together, and
- a seventh transistor having its collector connected to the junction of said diode anodes and having its emitter connected to said constant current source means.

6. Apparatus according to claim 5 wherein said means for placing said controlling means in said first and second operating modes comprises biasing means connected to the bases of said fifth, sixth, and seventh transistors for providing alternate conduction of said fifth and sixth transistors in response to an input signal above a threshold set by said biasing means and conduction of said fifth transistor when said input signal is below the threshold set by said biasing means.

7. Apparatus according to claim 6 wherein said means for providing a composite waveform comprises a pair of closely matched transistors in a common emitter amplifier configuration connected to said first and second capacitor means, respectively.

8. Apparatus according to claim 7 wherein said means for providing a composite waveform comprises first and second diodes connected to said first and second capacitor means, respectively.

9. Apparatus according to claim 4 wherein said means for controlling said discharging means comprises third and fourth transistors having their bases connected respectively to said first and second capacitor means and having their emitters connected to said constant current means, and fifth and sixth transistors receiving said input signal at the bases thereof and having their emitters connected to the emitters of said third and fourth transistors in a differential pair configuration.

10. Apparatus according to claim 9 wherein said means for placing said controlling means in said first and second operating modes comprises biasing means connected to the bases of said third and fourth transistors for providing alternate conduction of said third and fourth transistors in a self-oscillating mode when said input signal level is below the threshold set by said biasing means and for providing alternate conduction of said third and fourth transistors as determined by the conduction of said fifth and sixth transistors when said input signal level exceeds said threshold.

11. Apparatus according to claim 10 wherein said means for providing a composite waveform comprises a pair of closely matched transistors in a common emitter amplifier configuration connected to said first and second capacitor means, respectively.

12. Apparatus according to claim 10 wherein said means for providing a composite waveform comprises first and second diodes connected to said first and second capacitor means, respectively.

13. A pulse-interval modulation demodulator comprising:

a pair of input terminals, first and second transistors, means for connecting said input terminals to the bases of each of said transistors, respectively, third and fourth transistors, means for connecting the emitters of said third and fourth transistors to the collectors of said first and second transistors, respectively, a first terminal connectable to a first voltage source means for connecting the collectors of said third and fourth transistors to said terminal connectable to a voltage source, fifth and sixth transistors, means for connecting the bases of said fifth and sixth transistors to the collectors of said third and fourth transistors, first and second capacitors, means for connecting the emitters of said fifth transistor, said first capacitor and the base of said third transistor in series, means for connecting the emitters of said sixth transistor, said second capacitor and the base of said fourth transistor in series, first and second diodes, means for connecting the anode of said first diode to the base of said third transistor, means for connecting the cathode of said first diode to ground, means for connecting the anode of said second diode to the base of said fourth transistor, means for connecting the cathode of said anode to ground, first, second, third, and fourth resistors, a second terminal connectable to a second voltage source, means for connecting said first resistor between the cathode of said first diode and said second terminal, means for connecting said second resistor between the emitter of said fifth transistor and said second terminal, means for connecting said third resistor between the emitter of said sixth transistor and said second terminal, means for connecting said fourth resistor between the anode of said second diode and said second terminal, third and fourth diodes, means for connecting the cathodes of said diodes to the emitters of said third and fourth transistors, respectively, seventh and eighth transistors, means for connecting the cathodes of said third and fourth diodes to the collector of said seventh transistor, means for connecting the emitters of said first, second, and seventh transistors to the collector of said eighth transistor, means for biasing said first and second transistors off in the absence of an input signal above a threshold level at said input terminals, means for biasing said seventh transistor on in the absence of an input signal above a threshold level at said input terminals, a third terminal connectable to a third voltage source, a variable resistor, means for connecting the emitter of said eighth transistor in series with said variable resistor to said third terminal, means for biasing said eighth transistor on whereby a constant current is provided at its collector being variable by said variable resistor, ninth and 10th transistors, means for connecting the bases of said third and fourth transistors to the bases of said ninth and 10th transistors, respectively, means for connecting the emitters of said ninth and 10th transistors to said second terminal, a low pass filter having first and second ends, an output terminal, means for connecting the first end of said low pass filter to the collectors of said ninth and 10th transistors,
means for connecting the second end of said low pass filter to said output terminal, and
means for connecting the second end of said low pass filter to said third terminal.

14. A pulse-interval-modulation demodulator comprising:
a pair of input terminals,
first and second transistors,
means for connecting said input terminals to the bases of each of said transistors, respectively,
third and fourth transistors,
fifth and sixth transistors,
means for connecting the collectors of said third and fourth transistors to the bases of said fifth and sixth transistors, respectively,
a first terminal connectable to a first voltage source,
a variable resistor having first and second connections,
means for connecting the first connection of said variable resistor to said first terminal and the second connection of said variable resistor to the emitter of said first and third transistors,
means for connecting second end of said variable resistor to the emitters of said second and fourth transistors,
first and second diodes,
means for connecting the anodes of said diodes to the emitters of said first and third transistors and to the emitters of said second and fourth transistors, respectively,
means for connecting the cathodes of said diodes to ground,
a second terminal connectable to
a second voltage source,
means for connecting the collectors of said first and second transistors to said second terminal,
means for connecting the bases of said fifth and sixth transistors to said second terminal,
first, second, third, and fourth resistors,
a third terminal connectable to a third voltage source,
means for connecting said first resistor between the emitter of said fifth transistor and said third terminal,
means for connecting said second resistor between the base of said third transistor and said second terminal,
means for connecting said third resistor between the base of said fourth transistor and said second terminal,
means for connecting said fourth resistor between the emitter of said sixth transistor and said third terminal,
first and second capacitors,
means for connecting said first capacitor between the emitter of said fifth transistor and the base of said fourth transistor,
means for connecting said second capacitor between the emitter of said sixth transistor and the base of said third transistor,
a diode ring comprising a first, second, third, and fourth diode in series to form four junctions, the cathodes of said first and second diodes being connected at a first junction, the anodes of said third and fourth diodes being connected at a second junction, the cathode of said third diode and the anode of said first diode being connected at a third junction, the cathode of said fourth diode and the anode of said second diode being connected at a fourth junction,
means for connecting said first junction to ground,
means for connecting said third junction to the base of said third transistor,
means for connecting said fourth junction to the base of said fourth transistor,
means for connecting said second junction to said second terminal,
an output terminal, and
means for connecting said second junction to said output terminal.

15. PIM demodulator responsive to a PIM input signal apparatus comprising:
first capacitor means,
second capacitor means,
means for alternately charging said first and second capacitor means to substantially the same predetermined voltage,
means for alternately discharging said first and second capacitor means at a substantially constant discharge rate,
means responsive to said PIM input signal for controlling said discharging means to generate a series of ramp waveforms alternately at said first and second capacitor means, said first and second capacitor means alternately charging and discharging, said ramp waveforms having time periods proportional in length to the semi-period lengths of the PIM input signal,
means connected to said first and second capacitor means for providing a composite sawtooth waveform composed of alternatingly generated ramps, and
means for averaging said composite sawtooth waveform to provide a demodulated output signal.

16. Apparatus according to claim 15 wherein said charging means comprising:
a voltage source,
first and second diode means,
first and second resistor means,
means for alternately connecting in series a first branch comprising said voltage source, said first resistor means, said first capacitor means, and said first diode means, one end of said first diode means being connected to ground, and a second branch comprising said voltage source, said second capacitor means, said second resistor means and said second diode means, one end of said second diode means being connected to ground whereby said first and second capacitor means are alternately charged in a series RC circuit between said voltage source and ground.

17. Apparatus according to claim 16 wherein said means for alternately connecting in series said first and second branches comprises first and second transistors having their emitters connected between said first resistor means and said first capacitor means and between said second resistor means and said second capacitor means, respectively, and having their collectors connected to ground.

18. Apparatus according to claim 17 wherein said means for alternately discharging said first and second capacitor means comprises current source means.

19. Apparatus according to claim 18 wherein said means for controlling said discharging means comprises third and fourth transistors having their bases connected respectively to said first and second capacitor means and having their emitters connected to said constant current means, fifth and sixth transistors receiving said PIM input signal at the bases thereof and having their emitters connected to the emitters of said third and fourth transistors in a differential pair configuration.

* * * * *